United States Patent Office 3,513,199
Patented May 19, 1970

3,513,199
SUBSTITUTED ANILINO BENZYL ALCOHOLS
Stephen T. Ross and Charles L. Zirkle, Berwyn, Pa., assignors to Smith Kline & French Laboratories, Philadelphia, Pa., a corporation of Pennsylvania
No Drawing. Filed May 5, 1967, Ser. No. 636,259
Int. Cl. C07c 91/40; A61l 27/00
U.S. Cl. 260—571     4 Claims

ABSTRACT OF THE DISCLOSURE 2-(substituted anilino)-benzyl alcohols, the substituents being chlorine, trifluoromethyl, N,N-diloweralkylsulfamoyl or methyl, are useful as antipyretic and antiinflammatory agents. The compounds are generally prepared by reduction of the corresponding N-(substituted phenyl)-anthranilic acids.

---

This invention relates to novel 2-(substituted anilino)-benzyl alcohols which have useful pharmacodynamic activity. More specifically the compounds of this invention have antipyretic and antiinflammatory activtiy as demonstrated is standard animal pharmacological procedures. For example, an antipyretic effect is obtained in yeast-fevered rats at oral doses of 5–50 mg./kg. and in a filter paper granuloma test in rats, significant decrease in granuloma weight is obtained at oral doses of 30–60 mg./kg.

The 2-(substituted anilino)-benzyl alcohols of this invention are represented by the following general structural formula:

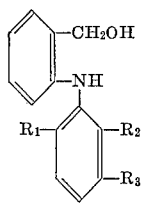

wherein:

$R_1$ and $R_2$ represent hydrogen or chlorine;
$R_3$ represents trifluoromethyl or N,N-diloweralkylsulfamoyl; and when $R_1$ and $R_2$ are not hydrogen, $R_3$ also is hydrogen or methyl.

By the term lower alkyl where used herein, groups having from 1 to 4 and preferably from 1 to 2 carbon atoms are indicated.

Preferred compounds of this invention are 2-(3'-trifluoromethylanilino)-benzyl alcohol and 2-(2',6'-dichloro-3'-methylanilino)-benzyl alcohol.

The compounds of this invention are generally prepared by the following process:

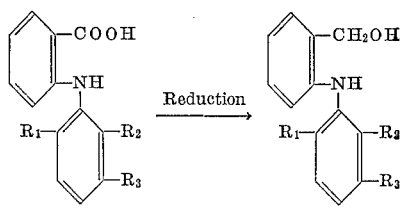

wherein $R_1$, $R_2$ and $R_3$ are as defined above. Thus, as shown, an appropriately substituted anthranilic acid is reduced to give the corresponding benzyl alcohol product. A reducing agent is employed, preferably a bimetallic hydride such as lithium aluminum hydride, or a borohydride reducing agent such as diborane in a nonreactive solvent such as tetrahydrofuran, ether or dioxane. The reduction is advantageously carried out at reflux temperature for from 4 to 12 hours.

The anthranilic acids used as starting materials as described herein are known or are prepared by methods known to the art, for example in British Pat. 1,027,060; Belgian Pat. 605,304; and U.S. Pat. 3,144,387.

The compounds of this invention may be administered orally or parenterally in conventional dosage unit forms such as tablets, capsules, injectables or the like, by incorporating the appropriate dose of a compound of Formula I with carriers according to accepted pharmaceutical practices.

The foregoing is a general description of how to prepare the compounds of this invention. The following examples illustrate this procedure by the preparation of specific compounds. However this should not be construed as limiting the scope of the invention since appropriate variations in the starting materials will produce other corresponding products set forth in Formula I.

EXAMPLE I

A mixture of 3.2 g. of lithium aluminum hydride and 100 ml. of tetrahydrofuran is stirred at room temperature for about 15 minutes. A solution of 10.0 g. of N-(3-trifluoromethylphenyl)-anthranilic acid in 60 ml. of tetrahydrofuran is then added, dropwise with stirring. The temperature is then raised to reflux for eight hours. The reaction mixture is cooled to room temperature and a solution of 2 g. of ammonium chlride in 8 ml. of water is added dropwise. The slurry is taken up in 300 ml. of ether, filtered and concentrated to give 2-(3'-trifluoromethylanilino)-benzyl alcohol, B.P. 170–175° C./0.3 mm.

EXAMPLE 2

A mixture of 0.63 g. of lithium aluminum hydride and 30 ml. of dry tetrahydrofuran is heated at 60° C. for 15 minutes, cooled and a solution of 2.08 g. of N-(2,6-dichloro-3-methylphenyl)-anthranilic acid in 20 ml. of tetrahydrofuran is added dropwise. The temperature is gradually raised to reflux for three and one-half hours. The cooled reaction mixture is treated with a saturated solution of ammonium chloride, keeping the temperature at about 10° C., taken up in ether and filtered. The dried filtrate is evaporated to give 2-(2',6'-dichloro-3'-methylanilino)-benzyl alcohol, M.P. 140–142° C.

EXAMPLE 3

By following the general procedures outlined in Examples 1 and 2, equivalent amounts of the following anthranilic acids are reduced to yield the indicated benzyl alcohols:
(a) N - (2,6-dichloro-3-dimethylsulfamoylphenyl) - anthranilic acid yields 2-(2',6'-dichloro-3'-dimethylsulfamoylanilino)-benzyl alcohol; and
(b) N - (2,6-dichlorophenyl) - anthranilic acid yields 2-(2',6'-dichloroanilino)-benzyl alcohol.

What is claimed is:
1. A chemical compound of the following formula:

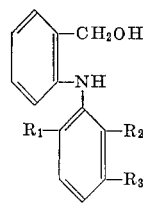

in which:

$R_1$ and $R_2$ are hydrogen or chlorine;
$R_3$ is trifluoromethyl and when $R_1$ and $R_2$ are not hydrogen, $R_3$ is also hydrogen or methyl.

2. A chemical compound according to claim 1, being the compound 2-(3'-trifluoromethylanilino)-benzyl alcohol.

3. A chemical compound according to claim 1, being the compound 2-(2',6'-dichloro-3'-methylanilino)-benzyl alcohol.

4. A chemical compound according to claim 1, being the compound 2-(2',6'-dichloroanilino)-benzyl alcohol.

References Cited

UNITED STATES PATENTS 1,822,974   9/1931   Laska et al. _____ 260—571

FOREIGN PATENTS 6,604,752   10/1966   Netherlands.

OTHER REFERENCES

Derwent: Belgian pat. rep., (680,700), No. 45/66, p. 5:4.

CHARLES B. PARKER, Primary Examiner

C. F. WARREN, Assistant Examiner

U.S. Cl. X.R.

260—999; 424—330

Notice of Adverse Decisions in Interferences

In Interference No. 97,961 involving Patent No. 3,513,199, S. T. Ross and C. L. Zirkle, SUBSTITUTED ANILINO BENZYL ALCOHOLS, final judgment adverse to the patentees was rendered May 25, 1973, as to claim 2.

[*Official Gazette November 27, 1973.*]